United States Patent Office 3,280,208
Patented Oct. 18, 1966

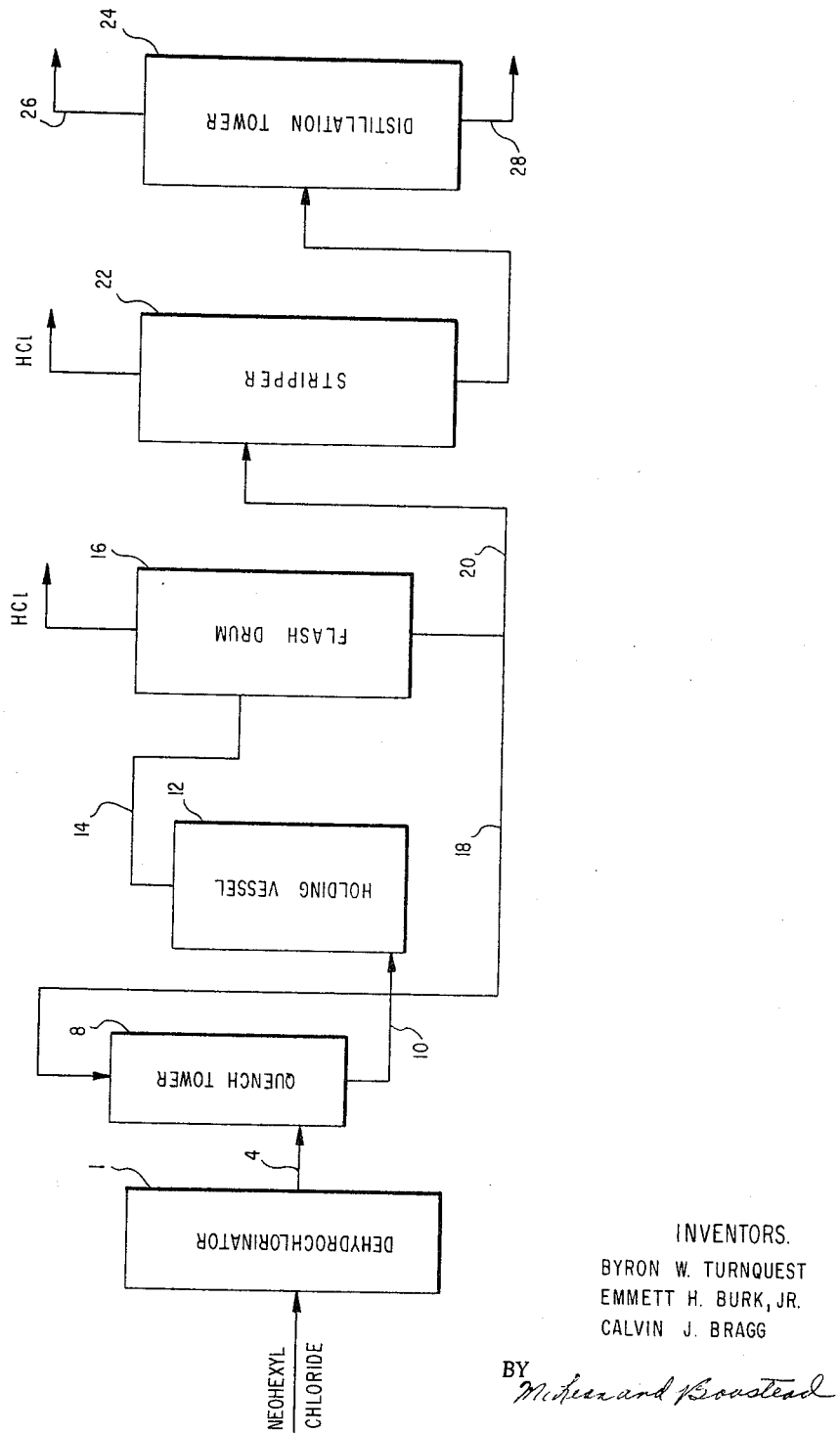

3,280,208
PROCESS FOR THE PRODUCTION OF QUATERNARY CARBON-CONTAINING MONOOLEFINS BY DEHYDROHALOGENATING CERTAIN ALKYL HALIDES
Byron W. Turnquest, Chicago, Emmett H. Burk, Jr., Hazel Crest, and Calvin J. Bragg, Chicago, Ill., assignors to Sinclair Research, Inc., New York, N.Y., a corporation of Delaware
Filed Jan. 15, 1964, Ser. No. 337,863
5 Claims. (Cl. 260—677)

This invention relates to an improved process for the production and purification of quaternary carbon-containing monoolefins.

It is very difficult to develop a commercially practical process for the manufacture of quaternary carbon-containing monoolefins such as 3,3-dimethyl butene-1. One of the reasons for this problem is the extremely unfavorable equilibrium of these monoolefins in isomeric mixtures. In the case of 3,3-dimethyl butene-1, for instance, at temperatures of above 127° C., it is the least favored of the $C_6$ olefin isomers. For example, dehydration of pinacolone alcohol leads to only a 3% yield of 3,3-dimethyl butene-1 which is its equilibrium value in a mixture of dimethylbutenes.

Copending application Serial No. 247,345, filed December 26, 1962, now U.S. Patent No. 3,227,770, in the names of Emmett H. Burk and William D. Hoffman describes a commercially practical process for the manufacture of quaternary carbon-containing monoolefins such as 3,3-dimethyl butene-1, which process produces high selective yields of the quaternary carbon atom-containing monoolefins with essentially little or no skeletal isomerization to other monoolefins of similar carbon content. The process comprises dehydrohalogenating a select feed material to be described below by subjecting it in the vapor phase to a temperature of at least about 400 to about 600° or even about 650° C., preferably about 450 or 500 to 575° C. in a non-catalytic environment. Although this dehydrohalogenation reaction in general leads to only a small amount of coke in the major area of the reactor itself, troublesome coking has been found in areas or zones wherein the reaction product gases are cooled to temperatures somewhat lower than the reaction temperature and where a liquid phase exists. In these zones, which can be within or without the reactor, and wherein these lower temperatures exist, the coking rate has been found to increase rapidly and commonly results in coking problems such as flow restriction, etc. The reason for the tendency toward coke deposition at these lower temperatures is not known for certain but it is believed that the hydrogen halide, unreacted feed and chloride by-products in the reaction product mixture play an important role.

It has now been discovered that this undesirable coking can be substantially diminished by quenching within a maximum quenching time the vapor phase reaction product effluent which is at a temperature greater than about 400° C. to a lower temperature at which unreacted feed chloride is condensed to a liquid phase in a maximum permissible quenching time of about 5 seconds, preferably within about 1 second, employing as the quench medium liquefied reactor effluent obtained, for example, in the separation step employed to remove from the reaction product hydrogen halide formed in the dehydrohalogenation reaction. The maximum quenching temperature may vary depending upon the pressure and in any event the temperature is low enough to condense the feed chloride to at least a partial liquid phase and generally the temperature is below about 300° C. For example, at atmospheric pressure the maximum temperature may be about 120° C. while at 300 p.s.i.g. this temperature is about 260° C. Quench temperatures of about 40 to 75° C. are advantageous.

The preferred liquefied reactor effluent is that obtained by flashing the effluent after the hydrogen halide back-addition step of the preferred method, to be described below, for obtaining a substantially pure 3,3-dialkyl alkene, such as neohexene. The ratio of the quench liquid to effluent product employed will vary, depending upon the temperature of the quench liquid and method of contact but in all cases will be such as to reduce the temperature of the effluent to the desired temperature within the maximum permissible quenching time. Ordinarily about 1 to 10 volumes of quench liquid per volume of effluent product are used.

The reaction product includes, in addition to the quaternary carbon atom-containing monoolefin, certain side reaction products and hydrogen halide which can be removed by any of the known procedures of the art as, for instance, by fractional distillation. However, since side products formed in the dehydrohalogenation are tertiary olefins having boiling points close to that of the desired quaternary carbon atom-containing monoolefin, removal of these side products by straight fractionation is difficult and requires high efficiency and costly fractionation equipment. It is preferred, therefore, to obtain the substantially pure quaternary carbon atom-containing monoolefine from the reaction mixture by the procedure which follows.

The reactor effluent is taken to a holding vessel wherein the reactor effluent is subjected in the liquid phase to rehydrohalogenation with hydrogen halide, preferably with the in-situ hydrogen halide formed by the dehydrohalogenation operation, under conditions that cause the hydrogen halide to selectively add to essentially all the tertiary olefins in the effluent mixture, converting them to their corresponding halides, with only a negligible amount of addition to the desired quaternary carbon-containing monoolefins.

In the rehydrohalogenation conditions are generally used which transform and hold hydrogen halide in the liquid phase and cause the aforementioned selective back-addition. These conditions will usually fall in the following ranges: temperature, about 20 to 150° C. and pressures sufficient to maintain the liquid phase, e.g. about 25 to 300 p.s.i.g., and, for instance, a liquid hourly space velocity (LHSV) of about 0.5 to 5.0. Ordinarily, these conditions will provide more than enough liquid hydrogen halide to react with all the tertiary olefins present in the reaction mixture but if for some reason less than stoichiometric or the desired quantities of the hydrogen halide are available in situ, additional hydrogen halide can be supplied from an outside source, the hydrogen halide having an atomic weight from 36 to 128.

After the rehydrohalogenation or "hydrogen halide back-addition step," the resulting mixture can be directed to a separator maintained at a reduced pressure, for instance, a flash drum, wherein the excess hydrogen halide is flashed off. The liquid effluent product, containing the halide by-products as well as the desired quaternary carbon atom-containing monoolefin, constitutes the preferred quench medium for the dehydrohalogenation effluent quenching operation referred to above, and a portion thereof is withdrawn and employed for that purpose. The remainder of the liquefied product can then be stripped by contact with an inert gas such as steam and distilled to obtain the desired quaternary carbon atom-containing monoolefin which boils at a significantly lower temperature than alkyl chlorides with which it is in admixture.

The halogenated hydrocarbon feed subjected to the dehydrohalogenation of the present invention may be represented by the general formula:

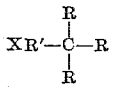

wherein R is an aliphatic monovalent hydrocarbon radical such as a lower alkyl, including cycloalkyl, of up to 8 carbons, the total carbon atoms in all R's being up to 18, preferably up to 12, and R may be branched or substituted with non-interfering groups; R' is a divalent aliphatic hydrocarbon radical, e.g. alkylene, of 2 to 8 carbons, preferably 2 to 4 carbon atoms; and X is a halogen atom having an atomic weight of 35 to 127. Preferably the halogen is substituted on a carbon atom beta to the neo-carbon atom. It is particularly preferred that the beta carbon atom be at an end of the carbon chain. Suitable feeds include, for instance, 1-chloro-3,3-dimethylbutane; 1-chloro-3,3-dimethylpentane; 2-chloro-4,4-dimethylpentane; etc.

As aforementioned, the dehydrohalogenation reaction is conducted in a non-catalytic environment. Thus, the dehydrohalogenation can be satisfactorily effected in a non-packed or tubular reactor as long as the reactor's internal or contact surfaces are and remain non-catalytic or the dehydrohalogenation may be conducted in such a reactor which contains non-catalytic, particulate contact material. The term "particulate" is meant to include, in addition to small individual forms such as beads, fragments, shavings, and like particles, other contact forms such as helices, wire meshes, etc. It is important that the contacting surfaces and contacting environment, in addition to being non-catalytic, be essentially free of acidic and basic materials, i.e., be essentially neutral and remain so during the reaction. Similarly, to insure a high selectivity in the dehydrohalogenation step, metals, metal oxides or other materials that may be present which react with hydrogen halide to give basic or acid environments should be held to a minimum. Thus the environment is such as to avoid the presence of materials that would cause a significant amount of hydrogen halide ionization. The surface therefore may be non-polar or non-ionic as such or may become so during the initial stages of reaction, which seems to be the case with the high nickel-containing metal surfaces.

Suitable contact surfaces whether they be walls of the reactor or contact materials in particulate form include for example, a quartz, Pyrex glass, ceramic, silica, coke, nickel and nickel alloys containing no more than about 40% iron, preferably less than about 20% or even less than about 10% iron. Included in the metal surfaces suitable for use in the present invention are those containing a high nickel content, usually at least about 40% by weight and no more than the defined amounts of iron. Preferably the nickel content is at least about 50% or even at least about 75%. Nickel alloys and other nickel-containing materials having iron or other metals that react with hydrogen halide present in amounts greater about 40% have been found unsuitable for use in the present invention in that they effect substantial isomerization to isomers of the desired quaternary carbon-containing monoolefins and consequently give a relatively poor selectivity to the desired monoolefins for a given conversion. Metals other than iron that are generally present in nickel alloys in minor amounts do not seem to have a detrimental effect on the selectivity to the desired product of the present invention. Illustrative of a suitable nickel alloy is Hastelloy C which is composed of 50 to 60% Ni, 4.5 to 7% Fe, and minor amounts of Cr, W, Si, Mn, Cu, P and S. Another suitable nickel alloy is Monel metal which is commonly composed of about 68% Ni, 31% Cu and 1% Fe.

When particulate contact materials are employed an LHSV (liquid hourly space velocity) of about 0.5 to 20, preferably about 2 to 10 is generally used. The reaction can be carried out at atmospheric, subatmospheric or superatmospheric pressure and pressures in the range of about 50 to 150 p.s.i.g. are preferred. If desired an inert gas such as nitrogen or carbon dioxide may be employed in the reaction and the inert gas can be in a ratio of about 0 or 1 to 20 or more moles to 1 mole of hydrogen chloride produced.

The following example, with reference to the attached diagrammatic drawing, is included to further illustrate the process of the present invention:

30 pounds of 1-chloro-3,3-dimethylbutene-1 (neohexyl chloride) per hour were fed to a Hastelloy C reactor 1 maintained at a temperature of 545° C. and a pressure of 160 p.s.i.g. to provide the chloride feed in the vapor phase. The conversion level of the feed was 50%. The reaction product effluent, composed primarily of a mixture of neohexene, isobutylene, isoamylenes, isoprene, 2,3-dimethylbutene-1, 2,3-dimethylbutene-2 and HCl, was withdrawn at the product outlet 4 of reactor 1 and quenched in quenching tower 8 located at the product outlet 4, with 80 lbs./hr. of liquid reactor effluent.

The liquid product effluent employed as the quenching medium was the liquefied product obtained from flashing zone 16 and was at a temperature of about 50° C. The quenching allowed the effluent temperature to be reduced to approximately 150° C. within 1 second and provided unreacted feed as a partial liquid phase. After quenching the total effluent was directed via line 10 to a holding vessel 12 where it was allowed to pass through at a liquid hourly space velocity of 1.8 (volumes of liquid per volume of reactor space per hour); a temperature of 50° C. and a pressure of 160 p.s.i.g. Under these conditions, the large part of the hydrogen chloride in the effluent mixture was held in the liquid phase and selectively reacted with all of the tertiary olefins in the effluent mixture converting them to their respective chlorides. Only a negligible amount of HCl addition to the neohexene occured. The resulting mixture of neohexene and alkyl chlorides was then sent by way of line 14 to flash drum 16 where excess HCl was flashed off and the effluent mixture containing neohexene and the alkyl chlorides, liquefied. A portion of this liquefied effluent is directed by means of line 18 to quench tower 8 to be employed as the quench medium for the product effluent from the dehydrohalogenation. The remainder of the liquefied effluent was sent through line 20 to a stripper 22 wherein the product mixture was steam-stripped of any residual HCl. The stripped product mixture is then subjected to simple distillation in distillation tower 24 to readily separate neohexene (B.P. 106° F.) via line 26 from the much higher boiling (124° to 240° F.) alkyl halides removed by line 28. The neohexene product may contain small amounts of t-butyl chloride which can be removed if desired by the method described in copending application Serial No. 337,783, filed in the name of E. H. Burk, B. W. Turnquest and C. J. Bragg. The high boiling alkyl halides are subjected to thermal treatment and distillation to remove 2,3-dimethylbutenes, after which neohexyl chloride is recycled to the dehydrochlorinator 1. After 300 hours of operation, inspection of the dehydrohalogenation product outlet showed an insignificant amount of coke formation.

It is claimed:

1. An improved process for the production of quaternary carbon-containing monoolefins which comprises thermally dehydrohalogenating in the vapor phase at a temperature of from about 400 to about 650° C. and in a non-catalytic environment, a halogenated hydrocarbon having the general formula:

$$XR'-\underset{R}{\overset{R}{\underset{|}{C}}}-R$$

wherein R is an alkyl radical of up to 8 carbon atoms, the total carbon atoms in the three R groups being up to 18; R' is an alkylene radical of 2 to 8 carbon atoms; and X is halogen having an atomic weight of 35 to 127, and quenching the resulting reaction product effluent having a temperature greater than about 400° C. to a temperature below about 300° C. and low enough to condense unreacted feed to the liquid phase within a maximum quenching time of about 5 seconds, by direct contact with liquefied product effluent from said dehydrohalogenation.

2. The process of claim 1 wherein the reaction product is quenched within a maximum quenching time of about 1 second.

3. The process of claim 1 wherein the halogenated hydrocarbon is 1-chloro-3,3-dimethylbutane.

4. An improved process for the production of quaternary carbon-containing monoolefins which comprises thermally dehydrohalogenating in the vapor phase at a temperature of from above about 400 to about 650° C. and in a non-catalytic environment, a halogenated hydrocarbon having the general formula:

$$XR'-\underset{R}{\overset{R}{\underset{|}{C}}}-R$$

wherein R is an alkyl radical of up to 8 carbon atoms, the total carbon atoms in the three R groups being up to 18; R' is an alkylene radical of 2 to 8 carbon atoms; and X is halogen having an atomic weight of 35 to 127 to produce a reaction product effluent containing the corresponding quaternary carbon-containing monoolefin in admixture with tertiary olefins and hydrogen halide, directing the reaction product effluent to a holding vessel maintained at a temperature of about 20 to 150° C. and a pressure sufficient to maintain a liquid phase to selectively rehydrohalogenate the tertiary olefins, and separating from the liquid effluent from said rehydrohalogenation said quaternary carbon-containing monoolefin.

5. An improved process for the production and recovery of quaternary carbon-containing monoolefins which comprises thermally dehydrohalogenating in the vapor phase at a temperature from above about 400 to about 650° C. and in a non-catalytic environment, a halogenated hydrocarbon having the general formula:

$$XR'-\underset{R}{\overset{R}{\underset{|}{C}}}-R$$

wherein R is an alkyl radical of up to 8 carbon atoms, the total carbon atoms in the three R groups being up to 18; R' is an alkylene radical of 2 to 8 carbon atoms; and X is halogen having an atomic weight of 35 to 127, to produce a reaction product effluent containing the corresponding quaternary carbon-containing monoolefin in admixture with tertiary olefins and hydrogen halide, quenching the reaction product effluent having a temperature greater than 400° C. to a temperature below about 300° C. and low enough to condense unreacted feed to the liquid phase within a maximum quenching time of about 5 seconds, by direct contact with liquid product from a rehydrohalogenation operation subsequently performed, directing the product effluent including hydrogen halide to a holding vessel maintained at a temperature of about 20 to 150° C. and a pressure sufficient to maintain a liquid phase to selectively rehydrohalogenate the tertiary olefins, employing a portion of the liquid product from said rehydrohalogenation as the quench medium in said quenching step and fractionally distilling remaining liquid product from the rehydrohalogenation to obtain said corresponding quaternary carbon-containing monoolefin.

No references cited.

ALPHONSO D. SULLIVAN, *Primary Examiner.*